United States Patent [19]

Singer

[11] Patent Number: 5,173,339
[45] Date of Patent: Dec. 22, 1992

[54] POPPET VALVE MANUFACTURE

[75] Inventor: Alfred R. E. Singer, Swansea, Wales

[73] Assignee: Alcan International Limited, Montreal, Canada

[21] Appl. No.: 660,134

[22] Filed: Feb. 22, 1991

Related U.S. Application Data

[63] Continuation of PCT/GB90/00723, May 10, 1990.

[30] Foreign Application Priority Data

May 10, 1989 [GB] United Kingdom ............... 8910792
Jun. 8, 1989 [GB] United Kingdom ............... 8913155

[51] Int. Cl.$^5$ .......................... B05D 3/12; B05D 1/02
[52] U.S. Cl. ................................... 427/289; 427/299; 427/405; 427/422; 427/425; 427/455; 29/890.129
[58] Field of Search ............... 427/423, 422, 34, 425, 427/289, 299, 405; 29/890.126, 890.128, 890.129, 890.13

[56] References Cited

U.S. PATENT DOCUMENTS

| | | | |
|---|---|---|---|
| 3,642,519 | 2/1972 | Tiner et al. | 427/34 |
| 4,619,845 | 12/1986 | Ayers et al. | 427/422 |
| 4,686,348 | 8/1987 | Johns et al. | 427/34 X |
| 4,839,239 | 6/1989 | Ducos et al. | 427/422 X |

Primary Examiner—Shrive Beck
Assistant Examiner—Katherine A. Bareford
Attorney, Agent, or Firm—Cooper & Dunham

[57] ABSTRACT

Poppet valves are manufactured by rotating a metal spray deposition nozzle relative to a rod or tube about the longitudinal axis of the rod or tube to deposit metal at a localized region intermediate the ends of the rod or tube so as to form a flange-like accretion on the rod or tube, and subsequently cutting through the rod or tube and the accretion at the center of the localized region to form two poppet valve preforms which are then subjected to finishing treatments. Metals having differing properties of heat, wear and corrosion resistance may be coated upon one another in forming said accretion.

9 Claims, 3 Drawing Sheets

POPPET VALVE MANUFACTURE

CROSS-REFERENCE TO RELATED APPLICATION

This is a continuation of PCT International Application No. PCT/GB90/00723, filed May 10, 1990, now abandoned.

BACKGROUND OF THE INVENTION

This invention relates to the manufacture of poppet valves and has a particularly useful but not exclusive application in the manufacture of poppet valves for use in high performance petrol and diesel engines.

The advent of the high performance petrol and diesel engine has made severe demands on the poppet valve manufacturer. Good performance at ever increasing temperatures coupled with the need for keeping costs to the lowest level have resulted in most valves being composite in nature. Often the head is made of a high performance steel friction welded to a lower cost steel stem or the valve is faced with an expensive oxidation resistant high temperature alloy.

SUMMARY OF THE INVENTION

The present invention provides a new approach to the manufacture of poppet valves using metal spray forming techniques.

According to this invention there is provided a method of manufacturing poppet valves including the step of spray depositing metal on to a localized region of a workpiece in the form of a rod or tube while rotating the workpiece and the spray gun relative to one another about the lengthwise axis of the workpiece, and subsequently cutting through the rod and deposited metal in a direction normal to said axis at the mid-length of said localized region.

The invention also provides a poppet valve when made by a method as described in the preceding paragraph.

It is usual but not essential for the spray deposited metal to be different from the metal of the rod forming the stem of the valve and to be a metal having a higher resistance to temperature and/or wear and/or corrosion. It may be desirable to spray deposit two or more different metals at the localized region, the first being for example a lower cost metal or a lighter metal, and the subsequent coating or coating thin coatings of more expensive metals having higher resistance to temperature and/or wear and/or corrosion, for example Stellite. The final coating material will ultimately form the area in contact with the valve seat, where operating conditions are most severe.

Where the rod or tube is twice the predetermined length of the poppet valve, the above method provides two poppet valve preforms, each of which can be forged and/or machined and/or ground and/or otherwise processed to form the finished valve. Where the workpiece is tubular, the ends will be suitably plugged.

Where the rod or tube is effectively continuous, the said localized region may be spaced from an end of the rod or tube by the predetermined length of a valve, and subsequent localized regions spaced from the first said localized regions and from each other by twice the said length, the workpiece being cut though at the middle of each localized region and mid-way between adjacent localized regions to form a series of poppet valve preforms.

The workpiece is preferably preheated at the or each localized region. The localized region may also be placed under axial compression to cause a bulge to form at the localized region prior to the commencement of spray deposition, so that the amount of metal which has to be sprayed is reduced.

To obtain some forms of distribution of the sprayed metal on the localized region the nozzle means is oscillated angularly and/or axially in a plane containing the longitudinal axis of the rod or tube about a position radially aligned with the middle of said localized region and directed towards said axis.

The invention further provides poppet valve manufacturing apparatus including means for supporting a rod or tube, spray deposition means including a spray gun directed towards the axis of such rod or tube means for rotating the spray gun and the rod or tube relative to each other about said axis, and a saw blade mounted for movement at right angles to said axis to cut through the rod or tube and the metal sprayed thereon.

The invention will now be described in more detail with reference by way of example to the accompanying diagrammatic drawings in which:

DETAILED DESCRIPTION OF THE PREFERRED EMBODIMENTS

Figure 4:
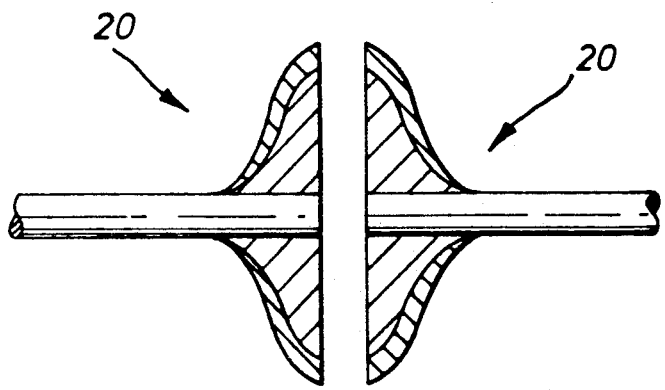
FIG. 4 is a schematic drawing illustrating the manufacturing process of the present invention after cutting the rod to produce two poppet valve preforms.

Referring to FIGS. 1 to 4, a rod 10 made from a medium alloy steel suitable for the valve stem of a poppet valve is mounted to be driven in rotation about its longitudinal axis at approximately 300 rpm. The length of the rod is twice the length of the poppet valves which are to be made. The localized region 12 of the rod at its mid-length, where the spray deposit is to be formed, is preheated in order to ensure a good bond. The bond can alternatively be improved by using a bond coat and/or by minimizing oxidation of the rod, for example by carrying out the process in an inert atmosphere. An alloy steel of good heat and corrosion resistant properties is sprayed from a stationary wire-fed arc spray gun 11 on to the rod at a localized region 12 at its mid-length to form a deposit 13. The spray is of conical formation and the resultant distribution of the sprayed metal is Gaussian, the deposit being a maximum at the middle 14 of the localized region and falling off sharply away from the middle in both axial directions. When the deposit has built up to a desired radial thickness at the middle of the localized region, spraying from the gun 11 is stopped and spraying of an alloy steel with high heat and corrosion resistance, e.g. Stellite, is commenced from a second metal spray gun 15 while rotation of the rod with the first deposit 13 continues. The surface produced by the spray deposition is relatively rough and consequently the surface of the first deposit 13 provides an excellent key for the second deposit 16. When the deposit 16 of alloy steel sprayed from the second spray gun reaches the required radial dimension at the middle 14 of the localized region, spraying from the second spray gun is stopped, and the rod and deposits are cut into two substantially identical parts by means of a narrow slitting saw 18 traversed in a plane normal to the axis of the rod at the middle of the rod. Two poppet valve preforms 20 are thus produced as shown in FIG. 4 which may then be transferred while still hot to a forging machine for forging to an accurate size preparatory to being machined and ground to form the required profile and seating face.

The speed of the rotation of the rod is not critical but will normally be in the range 50-1000 rpm so as to provide uniform deposition of the metal in a circumferential direction without causing liquid metal to be centrifuged off the periphery by the use of too high a rotational speed.

In a similar manner any required number of thin layers of hard refractory alloy metals and metal matrix composites can be formed in a manner ultimately to provide a surface on which the sealing face of the valve can be ground.

Although any metallic material can in principle, be used, aluminides of nickel, titanium and ion, metal matrix composite materials, stainless steel and nickel/chrome alloys are particularly advantageous.

The type of spray gun used will normally be selected according to the metal to be sprayed. Thus certain metals are available only in powder form necessitating the use of a plasma torch gun.

In a modified method according to the invention, the rod 10 is of indefinite length, and spray deposition of metal is carried out as described in relation to FIGS. 1 to 4 at a localized region at a distance equal substantially to the length of the required poppet valve from one end of the rod. After the saw has cut through the deposit and rod as described above, the saw is used to cut through the rod again to complete the second pre-form. The rod is then moved forward and a fresh spray deposit is formed at a localized region spaced from the new free end of the rod equal to the desired length of the poppet valve, and so on. Where the rod is very long, it may be preferable to fix the rod against rotation and to rotate the metal spray gun or guns about the axis of the rod.

Where it is desired to lighten the valve, the rod 10 may be replaced by a tube, but it will of course be necessary to plug or otherwise seal the head end of the tube.

Figure 1:
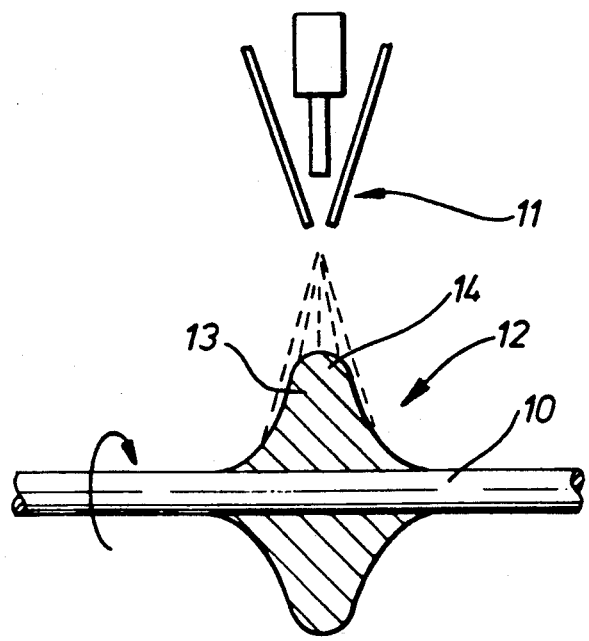
FIG. 1 is a schematic drawing illustrating manufacturing of poppet valve preforms in accordance with the present invention.
Figure 2:
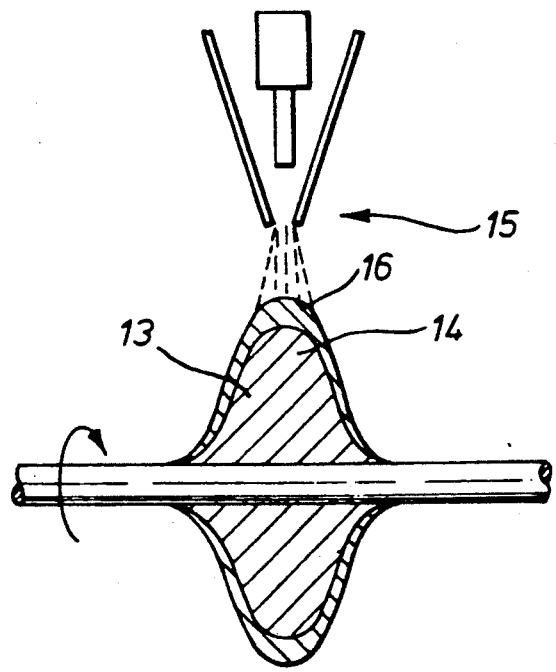
FIG. 2 is a schematic drawing illustrating the manufacturing process of FIG. 1 at a later time interval than depicted in FIG. 1.
Figure 3:
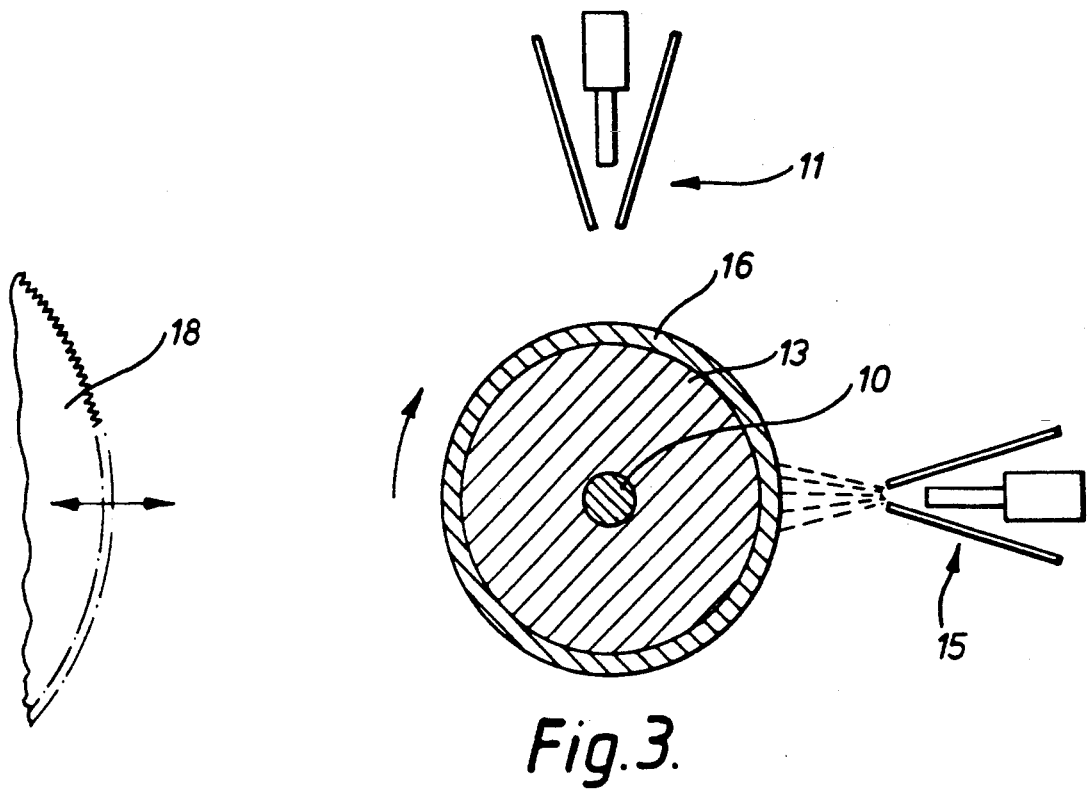
FIG. 3 is a schematic drawing illustrating the manufacturing process of FIG. 1 shown at yet another stage, with the rod shown in cross-section.
Figure 5:
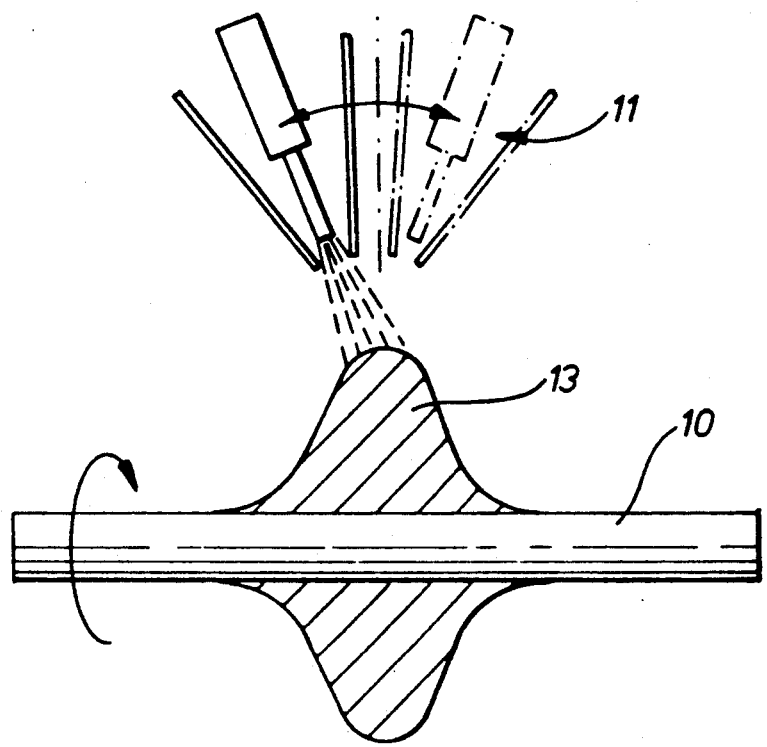
FIG. 5 illustrates another embodiment of the manufacturing process of the present invention.

In order to provide the sprayed metal with a desired profile, the metal spray guns may be arranged to oscillate angularly about the position shown in FIGS. 1 and 2, but moving in a plane containing the axis of the rod, as shown diagrammatically in FIG. 5 of the drawings, or may oscillate axially, or axially and angularly about the said position.

The preforms may be subjected to forging or hot isostatic pressing before or as an alternative to machining and grinding to form the finished valve, and may also be heat treated.

The resulting valves were found to be highly resistant to mechanical shock, and microscopic examination showed them to be 98% or more dense.

The method is highly advantageous over the usual method of manufacture which involves friction welding a forged valve head on to a stem, optionally coating vulnerable surfaces with wear/heat/corrosion resistant materials, and machining and/or grinding the valve head to the required shape.

I claim:

1. A method of manufacturing a poppet valve including the steps of spray depositing metal on to a localized region of a workpiece in the form of a rod or tube while rotating the workpiece and a spray gun from which the spray emanates relative to one another about the lengthwise axis of the workpiece, and subsequently cutting through the rod or tube and deposited metal in a direction normal to said axis at the mid-length of said localized region thereby to form a poppet valve.

2. A method as claimed in claim 1, wherein the rod or tube is substantially twice the length of the desired poppet valve, whereby two valve preforms are produced.

3. A method as claimed in claim 1, wherein the rod or tube is of indefinite length and a first said localized region is spaced from one end of the rod or tube by substantially the desired length of the valve, and further localized regions are spaced from the first localized region and from each other by substantially twice said desired length, and wherein the workpiece is cut through at the middle of each localized region and mid-way between adjacent localized regions to form a series of poppet valve preforms.

4. A method as claimed in claim 1, wherein two or more different metals are coated one upon the other by spray deposition at said localized region.

5. A method as claimed in claim 1, comprising the step of pre-heating the workpiece at the or each localized region.

6. A method as claimed in claim 1, comprising the step of forming an increased diameter portion at the or each localized region of the rod or tube prior to the spray deposition of metal at such region or regions.

7. A method as claimed in claim 1, wherein at least one localized region is placed under axial compression to form an increased diameter portion at said region, on to which said metal is sprayed.

8. A method as claimed in any claim 1, wherein a bond coat is applied to the workpiece at the or each of said localized regions before the spray deposition of metal at such region is commenced.

9. A method as claimed in claim 1, wherein the nozzle means is oscillated angularly and/or axially in a plane containing the longitudinal axis of the rod or tube about a position radially aligned with the middle of said localized region and directed towards said axis.

* * * * *